US008731750B2

(12) United States Patent
Oster

(10) Patent No.: US 8,731,750 B2
(45) Date of Patent: May 20, 2014

(54) SYSTEM FOR AUGMENTING THE COVERAGE, INFORMATION AND ROBUSTNESS OF AUTOMATIC IDENTIFICATION DEVICES OF SHIPS

(75) Inventor: Yann Oster, Frouzins (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 13/180,657

(22) Filed: Jul. 12, 2011

(65) Prior Publication Data

US 2012/0239285 A1    Sep. 20, 2012

(30) Foreign Application Priority Data

Jul. 13, 2010    (FR) ...................................... 10 02952

(51) Int. Cl.
*B60L 3/00*    (2006.01)
*H01Q 1/34*    (2006.01)

(52) U.S. Cl.
USPC ........................................... 701/21; 343/709

(58) Field of Classification Search
CPC ...................................................... B63B 49/00

USPC ................................. 705/1; 343/709; 701/21
See application file for complete search history.

(56) References Cited

U.S. PATENT DOCUMENTS

| 7,483,672 | B2 | 1/2009 | Hart et al. |
| 2008/0086267 | A1 | 4/2008 | Stolte et al. |
| 2008/0147257 | A1* | 6/2008 | Kuhlgatz et al. ................ 701/21 |
| 2009/0271054 | A1* | 10/2009 | Dokken ........................ 701/21 |

* cited by examiner

*Primary Examiner* — Fadey Jabr
*Assistant Examiner* — Basil T Jos
(74) *Attorney, Agent, or Firm* — Baker & Hostetler LLP

(57) ABSTRACT

A system for augmenting the coverage, information and robustness of an automatic identification system of ships incorporates standard AIS-type means, satellite links, coastal stations and processing centers handling the coordination of the means (maximizing the coverage of the system in time) and the processing of the data (merging of different information to create extended context information). The system implements a scheduling algorithm for the resources mobilized, in order to optimise the coverage by ensuring a given level of redundancy for the purposes of reliability and responsiveness of the system.

10 Claims, 3 Drawing Sheets

SYSTEM FOR AUGMENTING THE COVERAGE, INFORMATION AND ROBUSTNESS OF AUTOMATIC IDENTIFICATION DEVICES OF SHIPS

CROSS-REFERENCE TO RELATED APPLICATIONS

This application claims priority to foreign French patent application No. FR 10 02952, filed on Jul. 13, 2010, the disclosure of which is incorporated by reference in its entirety.

FIELD OF THE INVENTION

The object of the invention relates to a system and a method for augmenting the coverage, information and robustness of automatic identification systems, of AIS (Automatic Identification System) type, with which ships are equipped, intended for users on land or at sea, with no geographic limitation.

Hereinafter in the description, the expression "local context" designates a set of information relating to a local area, such as the presence of ships, their position and their specific characteristics. The expression "local AIS context" designates the local context information obtained by an AIS receiver, within a radius which corresponds to the very high frequency or VHF range. The expression "extended context" designates context information that is augmented in terms of range, content and reliability. The content may be augmented with, for example, information relating to objects that are not cooperating in the AIS sense, such as other ships or hazards for navigation: containers or, more generally, drifting objects.

An AIS cell corresponds to an area in which the AIS communications of a set of AIS transponders, embedded on ships or coastal stations, are self-organised and within the limit of VHF range.

The expression "global and dynamic coverage" is used to define a set of AIS cells which are federated by the system according to the invention using so-called reference ships and coastal stations located in the different cells.

A ship that has an AIS-type transponder, for exchanging information with various ships equipped with an AIS receiver or transponder, and satellite communication means, for exchanging with a processing centre, can be activated as reference ship for a time period T.

A reference ground or coastal station is a station provided with an AIS transponder, for exchanging information with the various ships equipped with AIS receiver or transponder and located in VHF range, and terrestrial communication means for exchanging with a processing centre.

A land-based processing centre will receive a set of information from various information sources, such as the coastal stations, the reference ships, radar stations, satellite imaging, for processing and consolidating the local contexts in order to produce extended context information. The extended context information is then broadcast to said stations and to the reference ships. A processing centre is associated with an area or with a geographic coverage.

The verb "consolidate" covers the action of collating and cross-checking the information collected by the different reference ships, by the coastal stations, or other observation means such as radars or satellite imaging, as will be detailed hereinbelow.

The AIS is an automatic identification system of the ships (MMSI registration, position, heading, speed, etc.) which are in direct visibility via a VHF link, i.e. within a radius of 20-30 nautical miles, which can be used to estimate the local context, producing more enriched information than that obtained with a radar. The main applications relate to the prevention of collisions at sea, the monitoring of traffic, navigation assistance, and, in the future, sea search and rescue missions.

Work and trials conducted in the USA and in Norway, for example, relate to the reception by satellite of the AIS signals transmitted by the ships, in order to have global information over a wide coverage. However, the waveform and the time-division multiple access mode (automatic organisation of the TDMA) of the AIS, designed for cells with a radius of 50 km, lead to multiple interferences of the useful signals on a receiver embedded on a satellite covering a wide area and therefore receiving a large number of signals originating from different cells by AIS VHF channel.

Without requiring specific satellites to be deployed, the proposed system according to the invention allows for a global coverage, based on existing AIS infrastructures, and produces reliable and enriched information.

The system can merge various information sources, from observation and detection means on land or otherwise embedded on ships, aircraft (aeroplanes, drones) or satellites. In addition to the global coverage and increased reliability, this composite information can then be used to identify incorrect AIS transmissions and non-cooperative objects without AIS transmitters.

BACKGROUND OF THE INVENTION

The prior art describes known AIS extension solutions.

A first solution consists in receiving AIS signals from all the ships present in an area, onboard specific satellites. This entails differentiating the AIS messages transmitted by ships in different cells, typically using an antenna implementing a spatial filtering with a very fine cellular coverage. This first solution, based on specific satellites with complex antennas, is very costly.

A second solution relies on the deployment of coastal stations and the aggregation of the information supplied by a coastal coverage. This second solution generally does not cover more than an area located within 50 km of the coasts.

REFERENCES USED

Ai: coverage area i
Nref: reference ship
Nrefi: reference ship i
Nt: ship equipped with an AIS transponder
Nr: ship equipped with an AIS receiver
Ni: ship i
Rm: shipping route
Sci: coastal station i; which are a priori all considered as reference coastal stations, i=1, 2, . . . coastal station No.,
Cti: processing centre
Ls: satellite link
Zi: AIS cell
Mci: consolidated information Mc for an area i, the set of consolidated information Mci.
Generally, the expression "reference station" equally designates the reference ships and the reference coastal stations.

SUMMARY OF THE INVENTION

The identification system according to an embodiment of the invention provides an extended, global coverage, without geographic limitation. For this, the system according to the invention incorporates standard AIS-type means, satellite links, coastal stations and processing centres handling the coordination of the means (in order to maximise the coverage of the system in time) and the processing of the data (merging of different information to create extended context information). It notably implements a scheduling algorithm for the resources mobilised, in order to optimise the coverage by ensuring a given level of redundancy for the purposes of reliability and responsiveness of the system.

An object of the invention relates to a system for augmenting the communication or automatic identification range of an AIS-type system, said system comprising, in combination, at least the following elements:

communication means allowing for the exchange of information between the various elements forming said system, one or more land-based processing centres Cti comprising:
- communication interfaces $I_p$, $I_{Sat}$, for the exchange of information with different users, the reception of information from reference ships Nrefi, and for the broadcasting of consolidated and extended information Mci after processing to said reference ships Nrefi, and coastal stations Sci.
- a set of processors P suitable for merging information of different types,
- one or more databases D,
- a memory M for storing information with a view to its processing, one or more terrestrial stations Sci linked with one or more processing centres Cti by communication means Ri, allowing for an exchange of information, one or more ships elected as reference ships Nrefi for a given time period T, said reference ships Nrefi communicating with the processing centres Cti by said satellite means, and with ships in VHF range, ships Nt, Nr provided with at least means for receiving information broadcast by a reference ship located in VHF range and/or reference coastal stations Sci in VHF range A processing centre Cti has one or more interfaces $I_G$ for receiving geo-referenced observation/detection data, and said set of processors P is suitable for aggregating the data from different reference ships and from coastal stations with geo-referenced data.

Another embodiment of the invention relates to a method for augmenting the range of an AIS-type system, said method being implemented in a system comprising the characteristics of the aforementioned systeming characterized in that it comprises at least the following steps:

defining one or more reference ground stations Sci, and one or more reference ships Nrefi, for a processing centre Cti controlling a given coverage area Ai,
- for each time period T or time slice of a given duration:
  - retrieving and accumulating various current local AIS contexts (for the time period T concerned) detected by the reference stations, reference ships Nrefi or reference coastal stations Sci, coming under the coverage area of the processing centre,
  - consolidating the AIS information, local context by local context, by incorporating in a database D any new information specific to said ships (ship identification, position, heading, speed, etc.),
- formatting for each reference station (ship or coastal station) Nrefi or Sci having to broadcast this information:
  - for a configured visibility radius, formatting a specific database Mci taking the information on objects in the global context database, within a given radius relative to the position of the reference station Nrefi or Sci scheduled for the broadcast,
- transmitting said formatted information Mci to said reference station or stations Nrefi or Sci, via satellite links Ls or via terrestrial communication means Ri,
- broadcasting of the global context information to users on land by using terrestrial communication means Ri,
- for a reference ship Nrefi,
  - collection of the local AIS context and transmission to the processing centre Cti via satellite link Ls,
  - broadcasting of the extended context Mci via AIS-type channel to the ships or the objects equipped with an AIS-type receiver located within a cell defined by the VHF range,
- for a reference coastal station Sci,
  - collection of the local AIS context and transmission to the processing centre Cti via terrestrial communication means Ri,
  - broadcasting of the extended context Mci via AIS-type channel to the ships or the objects equipped with an AIS-type receiver located within a cell defined by the VHF range.

BRIEF DESCRIPTION OF THE DRAWINGS

Other features and advantages of the device according to the invention will become more apparent from reading the description of an exemplary embodiment given as a nonlimiting illustration, with appended figures which represent.

DETAILED DESCRIPTION

In order to give a good understanding of the principle implemented in the extended AIS system according to an embodiment of the invention, the following example will be given in the context of a number of ships belonging, for example, to different AIS cells, a cell Zi being defined by the VHF communication range limit between the ships. The system given as an example will include ships equipped with AIS transponders, ships configured as reference ships for a given time period, coastal stations and processing centres.

The AIS system or any other device operating on the AIS principle automatically controls the allocation of the communication channel (TDMA time slot and frequency channel) between the various transponders. Thus, the system according to an embodiment of the invention will be able to acquire different information corresponding to a set of local contexts, and a consolidation will be prepared in the processing centres.

Figure 1:
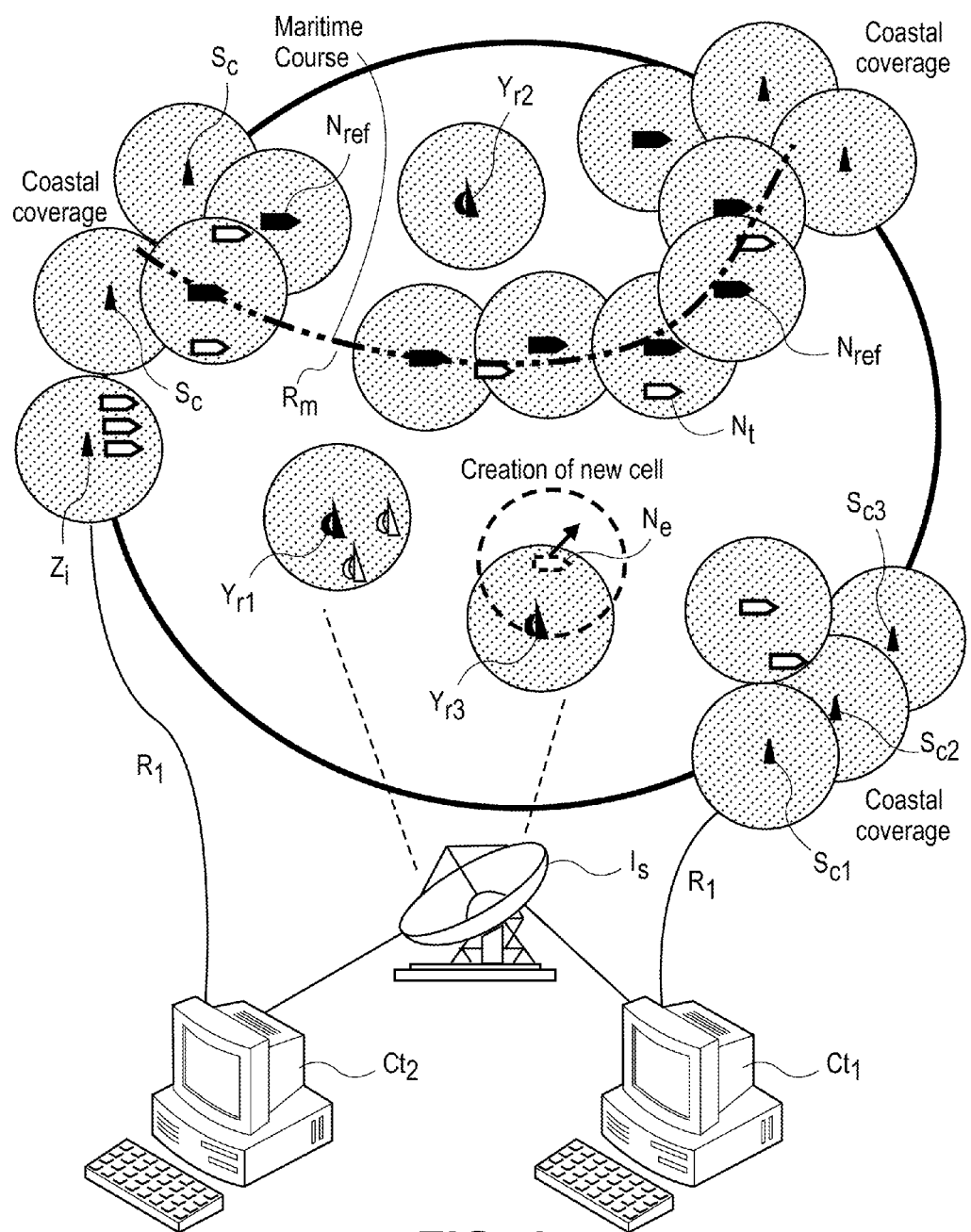
FIG. 1, a example of the distribution of the cells for a number of ships following a predefined maritime shipping route, FIG. 2, the sequencing of the operations implemented in the case of the system comprising reference ships and processing centres, and FIG. 3, an example of sequencing of the operations executed in the case of a coastal station acting as reference for ships in VHF range.

FIG. 1 illustrates, for a given time period (defined time slice):
- a specific shipping route $R_m$ followed by a set of ships, Ni. In this set of ships, some will be dynamically designated, for a time period T, as reference ship Nrefi,
- a number of reference coastal stations Sci,
- three yachts Yri, for example isolated, also declared as reference ships Nref,
- a ship Ne leaving a cell according to a heading and a speed, which will be declared as reference ship for a subsequent time period in order to extend the global coverage. Use is made, for example, of the information contained in a database combining, for an identity Idnav of a ship, its navigation route Rnav, in order to define the time slice T or period for which this ship can be configured as reference ship (by the processing centre controlling the area where the ship is located). When the ship does not follow a predefined route, it is possible to use heading and speed data to predict its route in the short term. To serve as a reference, this ship must have a satellite communication link, a number of land-based processing centres Cti, a land-based processing centre Cti controlling a given area Ai, an area Ai being, for example, represented in FIG. 1 by the bold ellipse, a centre comprising, for example as detailed in FIG. 2, the following elements:

communication means, notably interfaces $I_{sat}$, for implementing satellite links for receiving information from the reference ships Nrefi, and for broadcasting the consolidated and extended information Mci after processing by the centre to the reference ships Nrefi, terrestrial communication means Ri for receiving information from the reference coastal stations Sci, and for broadcasting the consolidated and extended information Mci after processing to these reference stations, one or more interfaces $I_G$ for receiving observation/detection geo-referenced data by external means such as radars, imaging, or even location systems (GPS type), not represented in the figure in the interests of simplicity, internet-type interfaces $I_I$ (FIG. 2), for example, for the exchange of information with different users (for example, monitoring, etc.), a set of processors Pi, $P_1$, $P_2$, . . . suitable for merging the information of different types and, possibly, for aggregating the data concerning different local AIS contexts originating from all the ships in AIS range of the reference ships or the coastal stations, with other data, for example, geo-referenced data, one or more databases D, a memory M, for the storage of the information with a view to its processing which is linked with the processors.

Figure 2:
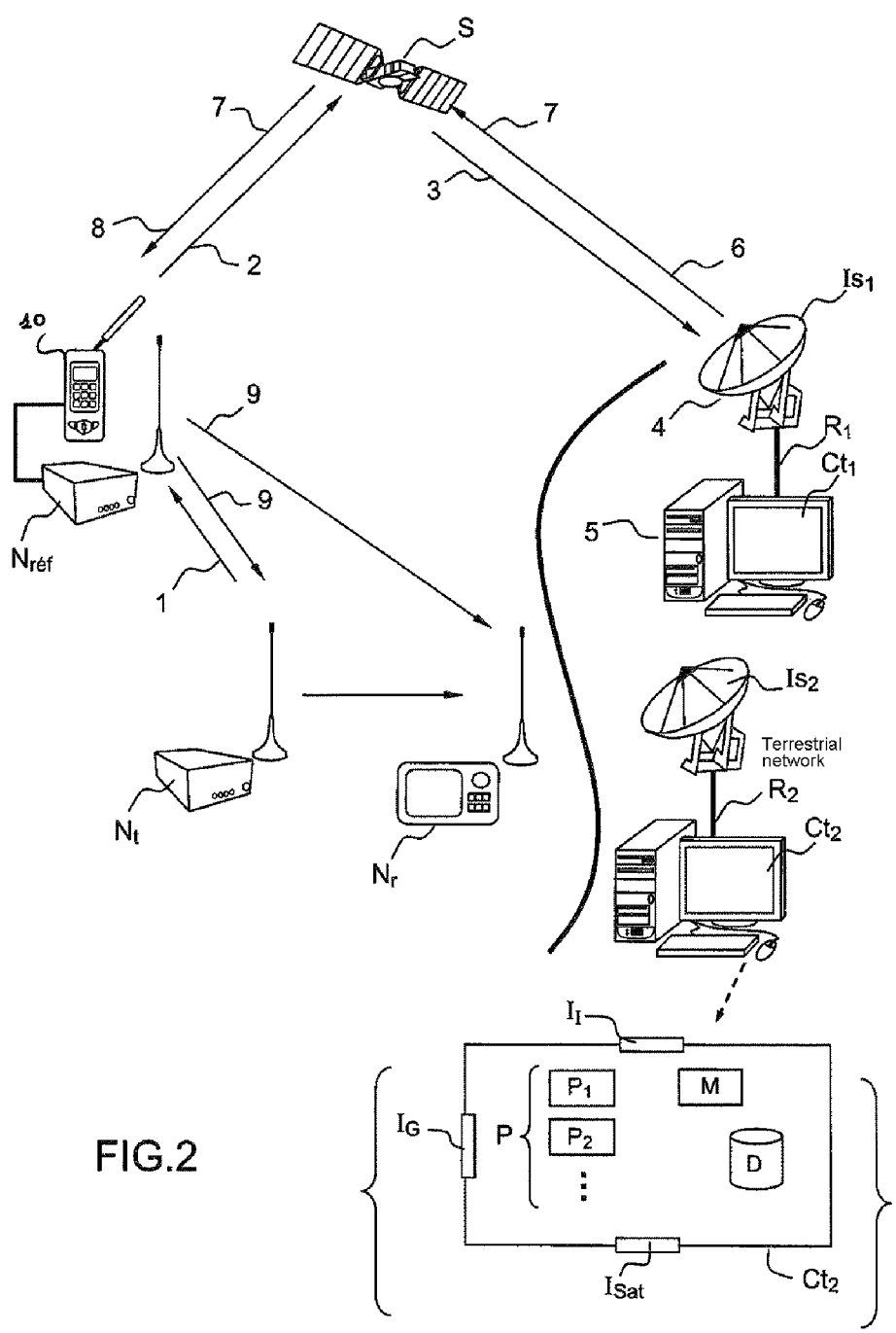

The system of satellite communication means, in this example, is situated outside the processing centres and consists of a terminal 10 arranged on a reference ship $N_{ref}$, the satellite S and satellite ground stations $I_S$ and the satellite link Ls represented in FIG. 2 by the arrows 7, 8.

Without departing from the context of the invention, the terminal 10 could be incorporated in the electronics of the AIS, and the satellite stations in the processing centres Cti.

Each of the ships Ni is equipped with an AIS terminal acting as a transmitter and receiver, some of these ships having a digital satellite link. The transmission rate is, for example, 9600 bauds or more, the two VHF frequencies commonly used being 161.975 MHz (maritime channel 87B) and 162.025 MHz (maritime channel 88B), which are reserved for this application.

An AIS transponder comprises a transmitter and one or more receivers. The number of receivers is, for example, chosen according to the desired redundancy for the system in order to avoid a loss (message collision) of information from ships. The AIS terminal also includes a satellite positioning system and a control screen. An AIS transponder embedded on a ship is interfaced with the onboard instruments, such as the compass, the heading change indicator, etc.

Some ships Nr may be equipped only with an AIS receiver. They cannot signal their position by AIS channel, but can benefit from the extended context information which is broadcast by a reference ship or a reference station in VHF range.

Any ship equipped with a satellite link Ls and an AIS transponder can be configured as reference ship Nref. It transmits the AIS context locally detected with the AIS receiver (identification and position of the ships provided with an AIS transponder and present in the area), and possibly additional information (radar tracks, text message locating localised objects, hazards such as drifting containers), via a satellite link Ls to a land-based processing centre Cti which controls the area in which the ship is located to process this information. The information transmitted may contain the following information: the number identifying the ship, the navigation status, the route, the speed of the ship, the change of heading speed, the longitude and latitude, the true heading, etc. (collected from the local AIS cell).

After the different information sources have been processed on the ground, the global and extended context information Mci (relating to a reference station) can be broadcast by a reference ship Nrefi or a coastal station Sci via the AIS channel, from an AIS transponder.

The system (ships, ground stations and processing centres) include satellite links notably allowing communication between the reference ships and the processing centres, and terrestrial communication network type links between the reference ground stations or reference coastal stations and the processing centres.

The global context may include the AIS-type information, and geo-referenced information relating to an unidentified objects, localised hazards, etc.

Operation of the System According to the Invention

The system will choose and schedule a number of reference ships Nrefi, and reference ground stations or coastal stations Sci, from all the ships equipped with satellite communication means and from all the land-based coastal stations, according to the coverage need, given the known position of the ships, their route and their scheduled movement. The course and the scheduling of professional and commercial ships are generally predefined and can be stored in a database.

The processing centres Cti can be coordinated, for example in two ways, to split the processing load by geographic area.

In a first mode of coordination of the processing centres, called centralised mode, a main particular centre Ctp dynamically orchestrates the partitioning of the coverage and the allocation of the areas Ai to be controlled by all the processing centres according to their availabilities and their computation powers. To ensure the reliability of the system, this main centre may be redunded in order to detect and overcome any failures.

In a second coordination mode, called self-organised mode, each processing centre Cti determines all the active processing centres with their respective processing capabilities, and coordinates with the other processing centres to partition the coverage area and allocate a sector or area Ai for each processing centre.

Regardless of the mode of coordination of the processing centres used to split the coverage area and the processing of the corresponding data, the information identifying Id(Cti, Ai) which centre Cti controls which geographic area Ai, must be transmitted to the reference ships Nref and to the reference coastal stations. These reference ships and stations can then transmit the collected local AIS context information to the processing centre or centres corresponding to their respective area Ai.

The movement of the ships causes them to cross reference ships Nrefi, which are in VHF radio range corresponding to approximately 50 km.

Any ship Ni provided with an AIS transponder newly detected by a reference ship Nrefi or a coastal station can serve as reference station, if it has satellite communication means, in order to augment the geographic coverage, the reliability and the responsiveness of the system.

The coverage of the system thus expands dynamically with the movements of the ships able to be configured as reference ships Nref.

Initially, in the absence of any reference ship, the coverage is defined by the association of the individual coverages of the coastal stations Sci. The detection and activation of reference ships makes it possible to extend the coverage.

A ship Nt, provided with an AIS transponder and a satellite link, which does not detect any other reference station within its local AIS perimeter, may be declared to a processing centre Cti to be configured as reference ship Nref in order to augment the global coverage of the system, that is to say allow a relaying (acquisition of the local context and broadcasting of the extended context) of the information within a perimeter that is greater than that usually defined by the AIS range.

The ships Nr equipped with simple standard AIS receivers receive the consolidated global context information Mci via AIS channel, which is broadcast by the reference stations, namely either the reference ships Nrefi, or the reference ground stations Sci.

For users at sea, the extended context information Mci for a local area Zi is derived from the global context information Mc, by being limited to a certain perimeter around the reference station concerned, in order for the extended information bit rate to be compatible with the bit rate available on the AIS channel.

The global context information Mc can be broadcast partially for each area or as a whole to users on land, via network means Ri, of terrestrial or other type.

FIG. 2 illustrates an example of sequencing for the exchanges of information between a reference ship Nref and a processing centre $Ct_1$ in a system comprising ships Nt with an AIS transponder (transmitter/receiver), one ship Nr with a simple AIS receiver, and two processing centres $Ct_1$, $Ct_2$.

A reference ship Nref communicates with the processing centres via a satellite link Ls and ground means $Is_1$ (satellite communication ground station) which may be common to a number of processing centres.

The sequencing of the operations implemented within the system according to the invention may be, in the case of an exchange between a reference ship and the processing centre, as follows:

1—the AIS transponders (transmitter/receivers) with which the ships Nt are equipped broadcast their AIS information, within the AIS cell Zi with which they are in VHF range, in order to establish a context local to an AIS cell, 2, 3, 4—the reference ships Nrefi located in this cell Zi receive these AIS messages and transmit this local context via satellite link Ls, via a satellite S to the processing centres $Ct_1$, $Ct_2$ via the interface modules Isat, and a terrestrial communication network Rj, the satellite links implementing, for example, Inmarsat or Thuraya terminals and systems, 5—all the local contexts corresponding to different AIS cells are merged in the processing centres $Ct_1$, $Ct_2$, possibly with other sources of information (radar, imaging), by means of one or more processors Pi with which the processing centres $Ct_1$, $Ct_2$, are equipped, and so on, 6, 7—the information Mci consolidated in a processing centre Ct is returned via the satellite link Ls to a reference ship Nref responsible for broadcasting it locally, 8—the consolidated context information Mci received by the reference ships, Nref, is locally broadcast, 9, via AIS channel, to all the AIS terminals in VHF range.

Figure 3:
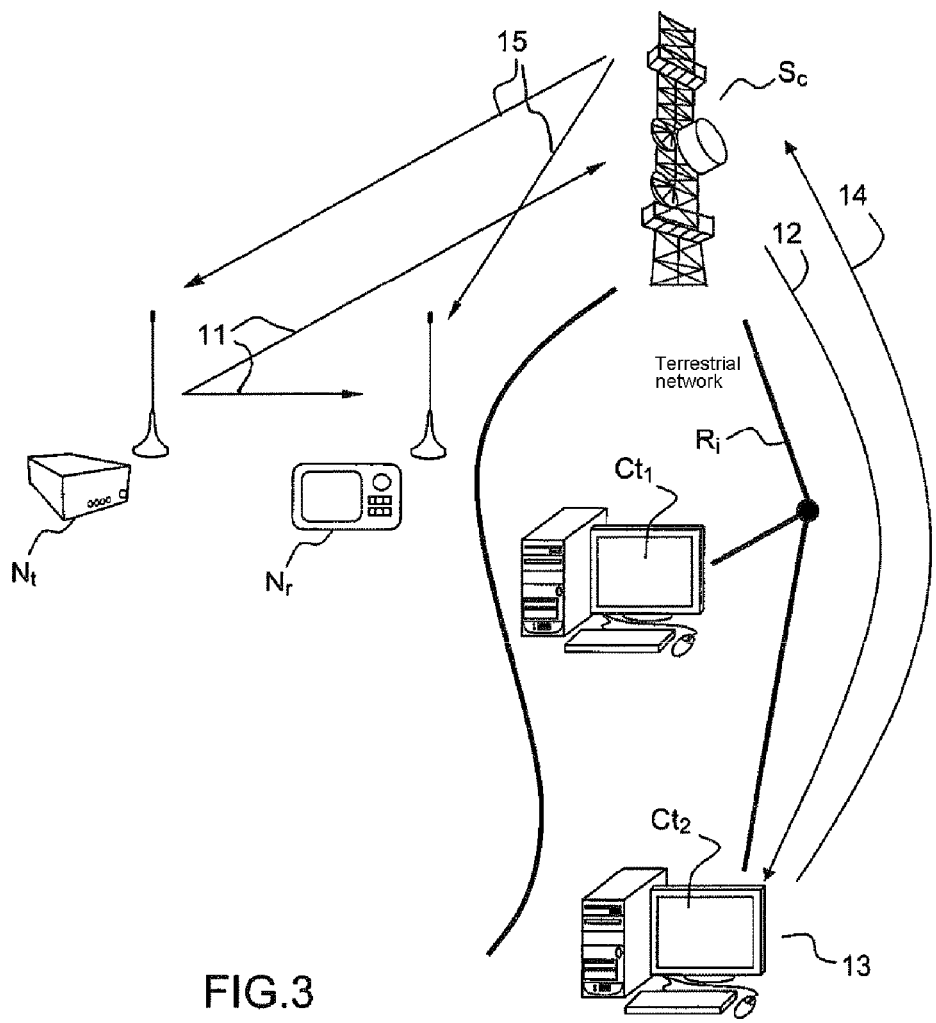

FIG. 3 diagrammatically represents the sequencing of the exchanges with a coastal station Sci which acts as reference station:

11—the AIS transponders of the ships Nt broadcast their AIS information, making it possible to establish the context local to an AIS cell, 12—the reference coastal station or stations Sci receive all the AIS messages, transmit this local context by terrestrial network R, to the corresponding processing centre $Ct_2$, i.e. to the processing centre which controls the area under which the station comes, 13—the local contexts originating from the AIS cells are merged, in the processing centres, by means of processors, with other information sources as explained previously, 14—the consolidated information Mci is returned by terrestrial network from the processing centre to the reference coastal station, 15—the reference coastal station broadcasts the locally consolidated information by AIS channel, to all the types of AIS terminals in VHF range.

Other Variants

According to one embodiment, allowing for a better reliability and responsiveness of the system, the system can allocate the "reference station" status to a set of co-located ships, that is to say, ships positioned in one and the same AIS cell Zi delimited by a given radio range.

The repetitive broadcasting of the consolidated global context information by AIS channel can be done by just one of these co-located ships or by a set of these ships by using a shared access mode such as TDMA which allows for an alternation in time by a set of these ships.

According to one implementation of the invention, the system can be used to detect inconsistencies in the information transmitted, or else a failure in the operation of the communications for a given ship.

For example, taking the case of two reference ships: a ship A and a ship B which are in VHF range, in one and the same cell, the processing centre which controls the area or cell in which the ships are located can decide that the ship A will monitor the information Mci (information relating to the area derived from the global context) transmitted by the ship B. The processing centre transmits the same consolidated information Mci to the two ships A and B. If A is configured to monitor the information transmitted by B, it will monitor the consolidated information that B broadcasts via the AIS channel to the ships in VHF range. To this end, the terminal of the ship A implements means (software or hardware) for determining the identity of the ship B and the content of the information that B broadcasts. This applies in the same way to coastal stations.

A reference station or ship implementing processing means and processing algorithms can thus monitor the correct broadcasting of the information by another reference station or ship.

A reference station or ship can then be configured, by choice to:

collect the local AIS context, broadcast the consolidated global information after processing on the ground, check the correct broadcasting of the global information by another reference ship/station.

According to another implementation of the invention, the system can also be used to check the consistency of the AIS information transmitted by a ship. For example, when a ship broadcasts an AIS message including incorrect position information, the system can detect that this position is not the correct position when this position does not geographically come under the AIS cell Zi of the reference ship or station having picked up the AIS message, or even when the AIS message has not been picked up by a reference station or ship close to the positioned concerned.

According to another implementation of the invention, the system can also be used to check the correct operation of the AIS transponder of each ship. A ship equipped with an active AIS transponder should appear with its position, within the extended context, which is broadcast by a reference station or ship. The AIS terminal can therefore check the consistency between the GPS position known onboard and the position of the ship obtained from the consolidated context information. A malfunction of the AIS transponder can thus be detected.

According to another implementation of the invention, the AIS messages from the ships detected by the system can be used to facilitate and enhance the acquisition of other AIS messages picked up by a receiver embedded on an aircraft or a satellite, by generating replicas of the known AIS messages to subtract them from the received signal according to the known Signal Cancelling technique. The AIS transmissions from the ships detected by the system are entirely known, equally in terms of content, of timing and of geographic origin of the messages. The processing of the AIS signal received from an aircraft or a satellite consists in virtually subtracting the known AIS transmissions, to reduce the number of interfering signals. This processing can be done locally onboard or on ground.

Data Processing Algorithm for Generating the Global Context:

For a processing centre Cti controlling a given area Ai (local, regional, national, continental, etc.), the processing algorithm will execute the following steps:

for each time period T (time slice of a given duration: 1-3 minutes, for example):
retrieving and accumulating (storing in time for one and the same reference station) various current local AIS contexts (for the time period T concerned) detected by the reference stations, reference ships Nrefi or reference coastal stations Sci, coming under the coverage area of the processing centre,
consolidating the AIS information, local context by local context, by incorporating in a database D any new information (ship identification, position, heading, speed, etc.),
if necessary, merging this global AIS information with the available additional data (radar, optical observations, text messages on the location of new hazards, etc.), a formatting step for each reference station (reference ship Nrefi or coastal stations Sci) having to broadcast this information:
for a configured visibility radius, formatting a specific database Mci taking the information on objects in the global context database Mc, by limiting itself to the ships and objects located within a given radius relative to the position of the reference station Nrefi or Sci scheduled for the broadcast.

Once the global context is generated, the method will implement the following steps:
a step of transmitting said formatted information Mci to said reference station or stations Nrefi or Sci, via satellite links Ls or via terrestrial communication means Ri,
a step of broadcasting the global context information to users on land by using terrestrial communication means Ri,
for a reference ship Nrefi,
the collection of the local AIS context and transmission to the processing centre Cti via satellite link Ls,
the broadcasting of the extended context Mci via AIS-type channel to the ships or the objects equipped with an AIS-type receiver located within a cell defined by the VHF range,
for a reference coastal station Sci,
the collection of the local AIS context and transmission to the processing centre Cti via terrestrial communication means Ri,
the broadcasting of the extended context Mci via AIS-type channel to the ships or objects equipped with an AIS-type receiver located in a cell defined by the VHF range.

The movement prediction horizon for a ship is very variable.

Professional or merchant ships respect departure and arrival timetables, and follow predefined routes. Their movement is therefore predictable in the long term. The signalling of a delay or of a change of route and/or speed also makes it possible to correct the long-term prediction.

On the other hand, a fishing boat is more free in its movements. A pleasure boat is even more changeable, and its prediction horizon is reduced to a few hours at best.

For each time period, the coverage is defined by the association of AIS cellular coverages corresponding to the set of reference stations (ships or coastal stations) selected.

Reference Ship/Station Scheduling Algorithm

For a processing centre Cti controlling a given area Ai or coverage (local, regional, national, continental, etc.)

Initialisation:

--- initialisation by declaration of the coastal stations Sci as reference stations
loop, at the rate of the time period T:
projection of the positions of the ships identified by the system:
  for each ship,
    for each future time period T + dt, up to the prediction horizon for the ship
      projecting the position, speed and heading, given the available information (predicted date and time of departure, of arrival, route, last signalling)
determination of the eligible ships Neli:
  for each future time period T + dt
    for each ship having the means mentioned previously allowing it to be used as reference ship Nref,
      if the ship (projected trajectory) departs from the associated AIS cell Zi or coverage defined for the time period T, then it is a priori eligible
selection of the reference ships Nrefi:
  iterating, for the desired redundancy level
    for each future time period T + dt
      for each eligible ship,
        searching to see if other eligible ships are in the immediate vicinity (in AIS/VHF range), and selecting the best according to a previously fixed criterion chosen from the following list: commercial ship, pricing, route, limitation on changes of configuration (reference ship activation) for each ship, etc.
        removing the selected ship from the list of eligible ships -continued

```
updating the definition of the coverage
withdrawing the reference ships Nrefi:
    for each future time period T + dt
        for each reference ship Nrefi,
            searching to see if other ships or reference coastal stations Sci
            are in the immediate vicinity (in AIS/VHF range), and identifying
            the N best (according to various criteria: commercial ship,
            pricing, route, limitation on changes of configuration for each
            ship, etc.), N defining the desired redundancy level
            removing the unselected ships from the list of reference ships
        updating the definition of the coverage.
```

The algorithm can be applied immaterially for scheduling the reference stations (ships or coastal stations) used:
- to collect the local AIS information, and to broadcast the consolidated global context information
- to solely collect the local AIS information
- to solely broadcast the consolidated global context information
- to check the correct broadcasting of the consolidated global context information, by another reference ship/station.

The commercial ships whose navigation courses are scheduled, are implicitly prioritised to serve as reference station, because of their extended prediction horizon.

The system according to the invention notably offers the following advantages:
- it allows to widen the coverage for collection and broadcasting of information without geographic limitation, and therefore to have a global coverage,
- it allows to improve reliability and detection responsiveness,
- it offers automatic and dynamic management of the allocation of the reference stations (ships or coastal stations), to optimise the coverage and the redundancy level for the reliability and the responsiveness of the system,
- the content of the information is augmented in range and in nature, with the detection of objects that are non-cooperative or passive in relation to the AIS system,
- it allows to broadcast geolocated information that is useful for navigation and safety, such as local weather, sea conditions or hazards not marked on maps,
- it uses existing means already deployed in operational systems (AIS, satellite links), with no risk of saturating these means,
- at any moment, a user of an AIS terminal can switch between a standard AIS mode and an extended AIS mode, if the summary information is marked as such,
- it allows for the broadcasting by AIS channel of extended/augmented context information to ships not necessarily equipped with satellite links,
- the monitoring of broadcasting makes it possible to detect an occasional or lasting failure of a ship configured as reference station, the system can then remove its reference status (until a new command), and schedule new resources,
- any ship provided with an AIS transponder can check the operation of its transponder, relative to its GPS and to the extended context information,
- the system can facilitate the reception of AIS signals acquired onboard a satellite or an aircraft, effected by a large number of interfering AIS messages, by providing exact information on all the AIS messages transmitted by the ships controlled by the system, to further extend the coverage (ships outside the coverage of the system, and with no satellite link).

The invention claimed is:

1. A system for augmenting a range of an existing Automatic Identification System (AIS) system, said system comprising:
   communication means to exchange information between one or more elements forming said system;
   one or more land-based processing centres comprising:
      communication interfaces to exchange information with different users, to receive information from reference ships, and from one or more coastal stations, and to broadcast consolidated and extended information after processing to said reference ships and coastal stations, which will relay to other ships via the AIS channel,
      a set of processors suitable to merge information of different types for aggregating the AIS data originating from all the ships within AIS range of the reference ships or the coastal stations, with other data,
      one or more databases, and
      a memory to store information to be processed;
   means for determining dynamically reference ships and associated service;
   the one or more coastal stations being equipped with an AIS transceiver and being linked with the one or more land-based processing centres by the communication interfaces, allowing for an exchange of information;
   one or more ships equipped with AIS transceiver and satellite communication means, eligible as the reference ships by the land-based processing centres controlling an area where the one or more ships are located for a given time period, said reference ships communicating with the land-based processing centres by satellite means, and with other ships within the VHF range by the AIS system; and
   at least two ships, different from the reference ships, provided at least with an AIS receiver to retrieve the extended information broadcast by a reference ship or reference coastal stations within VHF range.

2. The system according to claim 1, wherein one or more of the land-based processing centres has one or more of the communication interfaces for receiving geo-referenced observation/detection data, and said set of processors is configured to aggregate the received geo-referenced observation/detection data from different ones of the reference ships and the coastal stations having the geo-referenced observation/detection data.

3. The system according to claim 1, wherein one or more of the land-based processing centres further comprises:
   a first database in the one or more databases configured to store information specifically for identifying a ship, said information chosen from the following list: the ship's position, the ship's heading, the ship's speed, the ship's rate of turn, the ship's route, the ship's scheduled departure date and time, the ship's scheduled arrival date and time; and
   a second database in the one or more databases comprising information from radar and optical observations.

4. A method for augmenting a range of an existing Automatic Identification System (AIS)-type system, the method comprising:
   defining, using a land-based processing centre having processors, one or more reference coastal stations in a plurality of coastal stations, and one or more reference ships in a plurality of ships;

the land-based processing centre controlling a coverage area, such that for each time period or time slice of a given duration in a plurality of time periods or time slices;

retrieving and accumulating one or more current local AIS contexts, for a particular time period concerned, detected by reference stations, comprising at least a reference ship or a reference coastal station, coming under the coverage area of the land-based processing centre;

consolidating AIS information, for each local AIS context, by incorporating in a database, new information specific to said plurality ships comprising information associated with a ship identification parameter, a position, a heading, and a speed;

formatting for each reference station that broadcasts the information:
  for a configured visibility radius, formatting a specific database taking information on objects in a global context database, within a given radius from the reference station that is scheduled for the broadcast;

transmitting said formatted information to said reference station, via satellite links or via terrestrial communication means;

broadcasting global context information in the global context database to users on land by using the terrestrial communication means;

for the reference ship,
  collecting the local AIS context and transmitting to the land-based processing centre via satellite link;
  broadcasting an extended context via an AIS-type channel to the ships or the objects equipped with an AIS-type receiver located within a cell defined by a Very High Frequency (VHF) range;

for the reference coastal station,
  collecting the local AIS context and transmitting to the land-based processing centre via the terrestrial communication means;
  broadcasting the extended context via the AIS-type channel to the ships or the objects equipped with the AIS-type receiver located within the cell defined by the VHF range.

5. The method according to claim 4, wherein, in the land-based processing centre, the global context information is merged with available complementary data associated with at least one of radar data, optical observation data, or text messages concerning the location of new hazards such that the reference stations associated with an AIS cell further broadcast the merged information.

6. The method according to claim 5, wherein the merged information comprises geolocated information on weather conditions and sea conditions.

7. The method according to claim 4, wherein, for the land-based processing centre controlling the coverage area, the method comprises executing a scheduling algorithm for the reference stations, said scheduling algorithm comprising:
  initialisation by a declaration of the coastal stations as the reference stations,
  looping, at a rate equal to the time period:
    a projection of the position of the ships managed by the AIS-type system:
      for each ship in the plurality of ships, for each future time period, up to a prediction horizon for the ship, projecting the position, the speed and the heading, given information regarding predicted date and time of departure, of arrival, route, and last signalling,
    a determination of eligible ships in the plurality of ships, which can be defined as the one or more reference ships:
      for each said future time period, for each ship in the plurality of ships,
      if the ship has a projected trajectory that departs from the coverage area defined for the time period, then it is eligible to be defined by the land-based processing centre as one of the reference ships,
    a selection of the reference ships carried out by iterating, for the desired redundancy level for each said future time period for each eligible ship,
      searching to determine if other eligible ships are in the immediate vicinity defined by the VHF range, and selecting a best eligible ship according to one or more criteria comprising: whether the ship is a commercial ship, a pricing, a course, a limitation on changes of configuration for each ship,
    removing the selected ship from a list of eligible ships, and updating definition of the coverage area,
    withdrawing the reference ships: for each said future time period, for each reference ship,
      searching to determine if other reference ships or reference coastal stations are in the immediate vicinity, identifying N best reference ships or reference coastal stations, where N is an integer defining the desired redundancy level,
    removing the unselected ships from the list of eligible ships, and
    updating the definition of the coverage area.

8. The method according to claim 7, further comprising:
scheduling the reference stations to collect the local AIS-context information, and to broadcast the consolidated global context information;
solely collecting the local AIS-context information;
solely rebroadcasting the consolidated global context information;
checking a correctness of the rebroadcasting of the consolidated global context information by another reference station.

9. The method according to claim 4, further comprising:
detecting inconsistencies in the transmitted formatted information, or a failure in an operation of the communications for a given ship, wherein two ships that are in the VHF range, within the same cell, are selected,
such that the land-based processing centre which controls the cell within which the ships are located decides that a first of the two ships will monitor the information relating to the coverage area derived from the global context information transmitted by a second of the two ships,
the land-based processing centre transmitting same consolidated information to the two ships,
if the first ship is configured to monitor the information transmitted by the second ship, the first ship monitors the consolidated information that the second ship broadcasts via the AIS-type channel to other ships in VHF range, a terminal of the first ship implementing a means for determining an identity of the second ship and content of the information that the second ship broadcasts.

10. The method according to claim 4, further comprising:
checking consistency of the AIS information transmitted by a ship, wherein when the ship broadcasts an AIS message containing incorrect position information, the AIS-type system detects that the position is not correct, when this position does not geographically come under the cell of the ship or of the reference station that picks up the AIS message, or when the AIS message has not been picked up by another reference station or another reference ship close to a declared position of the reference ship.

* * * * *